UNITED STATES PATENT OFFICE.

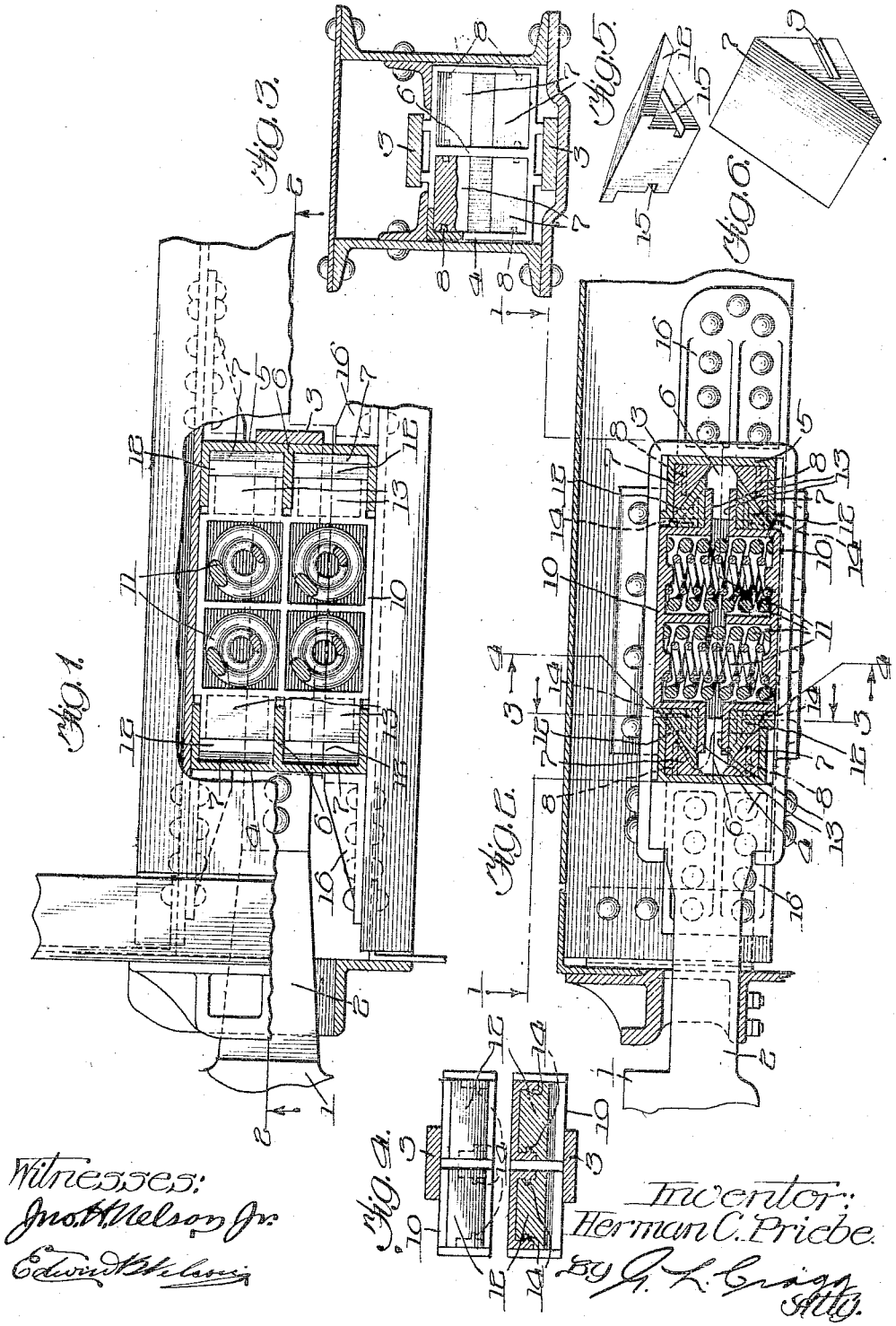

HERMAN C. PRIEBE, OF BLUE ISLAND, ILLINOIS.

FRICTION DRAFT-GEAR.

1,082,098.  Specification of Letters Patent.  Patented Dec. 23, 1913.

Application filed June 7, 1912. Serial No. 702,171.

*To all whom it may concern:*

Be it known that I, HERMAN C. PRIEBE, a citizen of the United States, residing at Blue Island, in the county of Cook and State of Illinois, have invented a certain new and useful Improvement in Friction Draft-Gears, of which the following is a full, clear, concise, and exact description, reference being had to the accompanying drawings, forming a part of this specification.

My invention relates to friction draft gears and has for its general object the provision of an improved arrangement of the spring mechanism entering into the construction of such gears and the improved formation of the friction elements whereby the friction surface supporting parts may be removed and replaced when worn, there being means for holding these friction surface supporting parts in position in the operating structures.

I will explain my invention by reference to the accompanying drawing showing the preferred embodiment thereof and in which—

Figure 1 is a plan view, partially in section, the sectional portion being taken on line 1 1 of Fig. 2; Fig. 2 is a vertical sectional view on line 2 2 of Fig. 1; Fig. 3 is a sectional view on line 3 3 of Fig. 2, a portion of one of the friction elements being broken away so as to show the manner in which it is supported in position and other friction portions being omitted to render the illustration clear; Fig. 4 is a sectional view generally taken on line 4 4 of Fig. 2; Figs. 5 and 6 show the separably mounted friction blocks which enter into the preferred form of the invention.

Like parts are indicated by similar characters of reference throughout the different figures.

The coupler, of which a portion 1 is shown, is provided with the usual shank 2 and is fixedly connected with the usual vertically disposed coupler yoke 3. The coupler yoke incloses a forward pocketed follower plate 4 and a rear pocketed follower plate 5. These follower plates are divided by vertical ribs 6 to afford two pockets per follower plate. Each pocket in each follower plate contains a top and bottom triangular friction block 7, one being shown in perspective in Fig. 6. Each pocketed follower plate thus contains four friction blocks, two per pocket. The side walls of the follower plates and the rib plates 6 are provided with insetting lugs 8 (Figs. 2 and 3) that enter lug receiving grooves 9 (Fig. 6), the lugs and grooves extending longitudinally of the coupler yoke and being horizontally disposed whereby the blocks 7 in each pocket are maintained a suitable distance apart and the blocks 7 which happen to be uppermost in the assembly of the parts are prevented from dropping. The friction blocks 7 in each pocketed follower plate are fixed with respect to such follower plate so that there is no undue frictional wear of the friction blocks upon the follower plates. The upper friction blocks in each follower plate are provided with sloping bottom friction surfaces and the bottom friction blocks in each follower plate are provided with upper friction sloping surfaces, these surfaces of the friction blocks in each follower plate diverging toward the opposite follower plate. Two friction members 10, 10 are normally pressed apart by springs 11 against the top and bottom sides of the coupler yoke 3, these coupler yoke sides limiting the extent to which the friction members 10 may be separated. The friction portions 12 of the elements 10, 10 are desirably of the form illustrated in perspective in Fig. 5. The friction elements 10 are provided with outsetting shelves 13 so that the element 10 which happens to be uppermost will be in position fixedly to support the end friction blocks 12 associated therewith. The elements 10 are formed at each end in two pockets, in each of which pockets a block 12 is received so that there are four blocks 12 to each element 10. The walls of these pockets are provided with insetting horizontal lugs 14 extending longitudinally of the coupler yoke and received within grooves 15 (Fig. 5) so that the friction blocks 12 in the friction element 10 that happens to be lowermost are prevented from dropping. Each element 10 and its end friction blocks are in fixed relation so as to avoid undue frictional wear. The shelves 13 are longitudinally slit, as illustrated in Fig. 1, to receive the rib plates 6 and permit of movement of these shelves within the vertical pockets of the contiguous follower plates whereby the sloping friction surfaces of the blocks 12 carried by the elements 10 are in contact with the corresponding surfaces of the blocks 7, as illustrated clearly in Fig. 2. The springs 11 are vertically disposed and are of sufficient strength normally to keep the friction elements 10 in separated relation.

When the coupler is thrust upon with sufficient force the forward follower plate moves to the rear, the rear follower plate being prevented from rearward movement owing to the rear draft lugs 16. The forward triangular blocks 7 press upon the engaging triangular blocks 12 and the rear triangular blocks 12 press upon the rear triangular blocks 7 whereby the friction elements 10 and the blocks 12 moving therewith are caused mutually to approach against the force of the springs 11, and thus in moving friction is created suitably to retard the rearward movement of the coupler. When the coupler is pulled upon with sufficient force the rear friction blocks 7 press upon the rear blocks 12 (the forward follower plate being held from forward movement by the forward draft lugs 16) and the forward blocks 12 press upon the forward blocks 7 whereby the friction elements 10 and the blocks carried thereby are caused mutually to approach against the force of said springs, friction being set up at the same time suitably to retard the forward movement of the coupler. When the abnormal pulling or pushing strain has been removed the springs 11 distend and effect the normal separation of the elements 10 and thereby the location of the forward follower plate against the forward end of the yoke 3 and the rear follower plate against the rear end of said yoke, whereby the equipment is restored to normal position preparatory to opposing further abnormal strains upon the gear.

While I have herein shown and particularly described the preferred embodiment of my invention I do not wish to be limited to the precise details of construction illustrated as changes may readily be made without departing from the spirit of my invention.

Having thus described my invention I claim as new and desire to secure by Letters Patent the following:—

1. A friction draft gear including pocketed follower plates having vertically disposed pockets; friction blocks in the top and bottom portions of said pockets, said pockets and the upper ones of said blocks being provided with interengaging lugs and grooves extending longitudinally of the draft gear whereby the upper friction blocks are prevented from dropping; friction elements entering said pockets; and spring mechanism pressing these latter friction elements into frictional engagement with the aforesaid friction blocks.

2. A friction draft gear including pocketed follower plates having vertically disposed pockets and friction portions; upper and lower friction elements entering said pockets to have frictional engagement with said friction portions, the upper friction element having shelves; forward and rear friction blocks carried by said shelves and entering the pockets of the follower plates; and spring mechanism pressing these latter friction elements into frictional engagement with the aforesaid friction portions.

3. A friction draft gear including pocketed follower plates having vertically disposed pockets and friction portions; and upper and lower friction elements entering said pockets to have frictional engagement with said friction portions, one of said friction elements including friction blocks and a portion carrying the same, said portion and blocks having interengaging lugs and grooves extending longitudinally of the draft gear whereby said friction blocks are prevented from dropping.

In witness whereof, I hereunto subscribe my name this first day of June A. D., 1912.

HERMAN C. PRIEBE.

Witnesses:
E. L. WHITE,
G. L. CRAGG.